(12) United States Patent
Demeter

(10) Patent No.: US 12,697,589 B2
(45) Date of Patent: Aug. 4, 2026

(54) ION REMOVAL FROM HEAVY ENDS USING ELECTRODIALYSIS

(71) Applicant: TexOPCO, LLC, Houston, TX (US)

(72) Inventor: Ethan L. Demeter, The Woodlands, TX (US)

(73) Assignee: TexOPCO, LLC, Houston, TX (US)

( * ) Notice: Subject to any disclaimer, the term of this patent is extended or adjusted under 35 U.S.C. 154(b) by 841 days.

(21) Appl. No.: 18/080,856

(22) Filed: Dec. 14, 2022

(65) Prior Publication Data

US 2023/0182079 A1 Jun. 15, 2023

Related U.S. Application Data

(60) Provisional application No. 63/289,819, filed on Dec. 15, 2021.

(51) Int. Cl.
B01D 61/46 (2006.01)

(52) U.S. Cl.
CPC ........ B01D 61/463 (2022.08); *B01D 2317/06* (2013.01)

(58) Field of Classification Search
CPC .............. B01D 61/463; B01D 2317/06; B01D 2311/243; B01D 61/44
See application file for complete search history.

(56) References Cited

U.S. PATENT DOCUMENTS

| | | | |
|---|---|---|---|
| 5,961,803 A * | 10/1999 | Landfors | D21C 11/066 |
| | | | 205/750 |
| 7,632,387 B1 | 12/2009 | Hryn et al. | |
| 7,662,267 B2 | 2/2010 | Carson et al. | |
| 2008/0230376 A1 | 9/2008 | Brauns | |
| 2012/0279869 A1 | 11/2012 | Murakami et al. | |
| 2014/0318969 A1 * | 10/2014 | Medoff | B01D 53/32 |
| | | | 204/540 |
| 2015/0108007 A1 | 4/2015 | Ganzi et al. | |
| 2020/0001251 A1 * | 1/2020 | Demeter | B01D 69/02 |
| 2020/0155967 A1 * | 5/2020 | Mcdonald | B01D 65/003 |
| 2020/0324249 A1 * | 10/2020 | Li | C02F 1/4693 |

OTHER PUBLICATIONS

International Search Report and Written Opinion dated Mar. 21, 2023, directed to International Application No. PCT/US2022/081545; 20 pages.

* cited by examiner

*Primary Examiner* — Bryan D. Ripa
(74) *Attorney, Agent, or Firm* — ePatentManager.com; Guerry L. Grune

(57) ABSTRACT

Provided are electrodialysis systems for removing ions from heavy ends. The electrodialysis systems include an electrodialysis device comprising a brine inlet stream, a heavy ends inlet stream, a brine outlet stream, and a product outlet stream, wherein the brine outlet stream comprises more acetic acid than the brine inlet stream, and the product outlet stream comprises no more than 10% the amount of ions relative to an amount of ions in the heavy ends inlet stream.

10 Claims, 2 Drawing Sheets

ION REMOVAL FROM HEAVY ENDS USING ELECTRODIALYSIS

REFERENCE TO RELATED APPLICATIONS

This application claims the benefit of U.S. Provisional Application No. 63/289,819, filed Dec. 15, 2021, the entire contents of which are incorporated herein by reference.

FIELD

The present invention relates to a process for removing ions from heavy ends, and, more specifically, the disclosure relates to a process in which an electrodialysis system is used to concentrate ions from heavy ends into the aqueous brine.

BACKGROUND

Vinyl acetate, a precursor to polyvinyl acetate and polyvinyl alcohol, is produced via the reaction of acetic acid and ethylene with oxygen in the presence of a catalyst. A common issue encountered in acetoxylation reaction is the formation of heavy ends—consisting of acetates, acetic acid, vinyl acetate polymers, and ethylene—that interfere with the conversion of acetic acid to vinyl acetate resulting in lower yields and fouling. The heavy ends are removed and treated as hazardous waste, which can make handling and disposal costly. Particularly, the presence of potassium and chromium acetates make the treatment of heavy ends more difficult because of EPA regulations on the concentration of ions that can be released in the air after incineration.

Some of the commonly used methods for removing ions from waste streams include reverse osmosis, ion exchange resins, and electrodialysis. Electrodialysis is a membrane process that involves transport of ions across semipermeable ion-exchange membranes in the presence of an electric field.

SUMMARY

Provided herein are processes for removing ions from a heavy ends waste stream. Also disclosed are methods of removing ions from a heavy ends waste stream. A heavy ends waste stream can be generated during an acetoxylation process for forming vinyl acetate monomer. The generated waste stream, known as "heavy ends" includes acetic acid, ethylene glycol, vinyl acetate, ethylene, and acetate compounds. Many of these constituent species (e.g., acetic acid, ethylene glycol, vinyl acetate, ethylene, and acetate compounds) are unspent reactants, as well as a mixture of undesired byproducts. Further, a key aspect of the acetoxylation process is that alkali metal ions are used to modulate/control the process.

Conventionally, the "heavy ends" are primarily handled by thermal decomposition/incineration. However, the presence of alkali metal cations, such as potassium, and corrosion byproducts such as chromium complicate the incineration process. For example, air permitting regulations that limit the amount of ash (produced during thermal decomposition of alkali metal acetates) and chromium that can be emitted per day. Chromium is particularly problematic as hexavalent chromium is a known carcinogen that is strictly monitored by the Environmental Protection Agency.

In some embodiments, provided is an electrodialysis system for removing ions from heavy ends, the electrodialysis system comprising: an electrodialysis device comprising a brine inlet stream, a heavy ends inlet stream, a brine outlet stream, and a product outlet stream, wherein the brine outlet stream comprises more acetic acid than the brine inlet stream, and the product outlet stream comprises no more than 15% the amount of ions relative to an amount of ions in the heavy ends inlet stream.

In some embodiments of the electrodialysis system, each of the heavy ends inlet stream, the brine inlet stream, the brine outlet stream, and the product outlet stream comprise one or more of chromium or potassium ions.

In some embodiments of the electrodialysis system, the product outlet stream comprises no more than 50% the amount of chromium ions as that of the heavy ends inlet stream.

In some embodiments of the electrodialysis system, the product outlet stream comprises no more than 15% the amount of potassium ions as that of the heavy ends inlet stream.

In some embodiments of the electrodialysis system, the brine outlet stream comprises at least 400% the amount of potassium ions as that of the brine inlet stream.

In some embodiments of the electrodialysis system, the brine inlet stream comprises no chromium ions.

In some embodiments of the electrodialysis system, the conductivity of the heavy ends inlet stream is less than or equal to 10 microsiemens per centimeter.

In some embodiments of the electrodialysis system, the heavy ends inlet stream comprises a composition that is different from the brine inlet stream.

In some embodiments of the electrodialysis system, the electrodialysis system comprises two or three electrodialysis devices.

In some embodiments of the electrodialysis system, the system achieves 50-70% removal of chromium ions from the heavy ends inlet stream.

In some embodiments of the electrodialysis system, the system achieves 85-100% removal of potassium ions from the heavy ends inlet stream.

In some embodiments, a method for removing ions from heavy ends is provided, the method comprising: routing a brine inlet stream and a heavy ends inlet stream to an electrodialysis device, wherein a brine outlet stream of the electrodialysis device comprises more acetic acid than the brine inlet stream, and a product outlet stream of the electrodialysis device comprises no more than 15% the amount of ions relative to an amount of ions in the heavy ends inlet stream.

In some embodiments of the method, each of the heavy ends inlet stream, the brine inlet stream, the brine outlet stream, and the product outlet stream comprise one or more of chromium or potassium ions.

In some embodiments of the method, the product outlet stream comprises no more than 50% the amount of chromium ions as that of the heavy ends inlet stream.

In some embodiments of the method, the product outlet stream comprises no more than 15% the amount of potassium ions as that of the heavy ends inlet stream.

In some embodiments of the method, the brine outlet stream comprises at least 400% the amount of potassium ions as that of the brine inlet stream.

In some embodiments of the method, the brine inlet stream comprises no chromium ions.

In some embodiments of the method, the conductivity of the heavy ends inlet stream is less than or equal to 10 microsiemens per centimeter.

In some embodiments of the method, the heavy ends inlet stream comprises a composition that is different from the brine inlet stream.

In some embodiments of the method, the product outlet stream and the brine outlet stream are routed to a second electrodialysis device.

In some embodiments of the method, the method achieves 50-70% removal of chromium ions from the heavy ends inlet stream.

In some embodiments of the method, the method achieves 85-100% removal of potassium ions from the heavy ends inlet stream. In some embodiments, any one or more of the features, characteristics, or elements discussed above with respect to any of the embodiments may be incorporated into any of the other embodiments mentioned above or described elsewhere herein.

DETAILED DESCRIPTION

Figure 1:
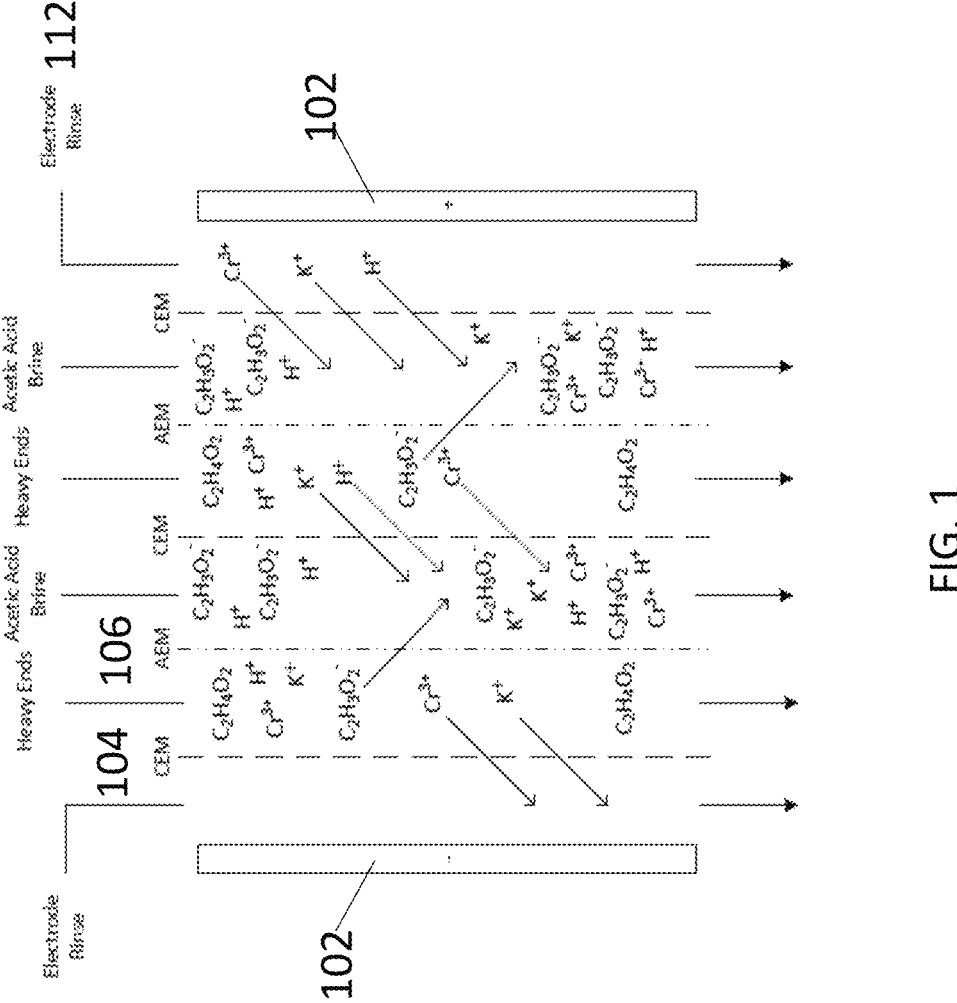
FIG. 1 shows an electrodialysis device for the removal of ions from heavy ends, according to some embodiments.

Described herein are devices, systems, and methods for removing ions from heavy ends using electrodialysis. As described above, heavy ends is a waste stream generated by the acetoxylation process that forms vinyl acetate monomer, and can include acetic acid, ethylene glycol, vinyl acetate, ethylene, and acetate compounds. Many of these compounds present in heavy ends are unspent reactants and a mixture of undesirable byproducts. However, the heavy ends waste stream is typically disposed of using thermal decomposition or incineration. Due to environmental concerns, air permitting regulations limit the amount of ash and chromium that can be emitted per day. Ash is produced during the thermal decomposition of alkali metal acetates, and chromium, and specifically hexavalent chromium, is a known carcinogen that is strictly monitored by the Environmental Protection Agency.

Some commonly used methods for removing ions from waste streams include reverse osmosis, ion exchange resins, and electrodialysis. Reverse osmosis is the most commonly applied technology for ion removal from water streams, but its use is unfeasible in this application due to the fluid not being water-based. It is likely that no fluid would permeate the membrane and the high organic content would foul the membranes. Another ion removal process is ion-exchange using weak and/or strong base anion resins. However, for heavy ends with high ion concentration, these resins would be exhausted quickly requiring frequent regeneration, maintenance, and disposal as needed.

Electrodialysis is a membrane process that involves the continuous transport of ions across semipermeable ion-exchange membranes in the presence of an electric field. Using a modified version of a conventional electrodialysis process, the ions from the heavy ends can be concentrated in an aqueous brine, providing two benefits: (1) lower concentration of ions present in the heavy ends and (2) reduced volume of waste (brine) for disposal. The reduced concentration of ions in the heavy ends mitigates issues with air permitting regulations of the exhaust from the heavy ends incineration process. The ability to produce a concentrated aqueous brine reduces the volume of the waste to be disposed, thus minimizing operating expense associated with waste disposal.

As described herein, the devices, systems, and methods for removing ions from a heavy ends waste stream utilize an electrodialysis process. However, because the heavy ends is non-aqueous and essentially non-conductive (less than 10 microsiemens per centimeter), the heavy ends has a very limited solubility in water, and the heavy ends has a high concentration of acetic acid (greater than 20 wt. %), electrodialysis is not an obvious choice as an ion removal process. Accordingly, the devices, systems, and methods described herein for removing ions form heavy ends have been developed to account for these challenges.

First, the electrodialysis devices, systems, and methods for removing ions from heavy ends have been developed to account for the minimal conductivity of the heavy ends. Generally, electrodialysis works by applying an electric field to external electrodes that sandwich alternating cationic and anionic exchange membranes. The conductivity of the fluid and ionic mobility of the dissolved ions in the fluid dictate how much energy is required to move the ions to and through the nearest ion exchange membrane. In its most common application, electrodialysis moves ions in brackish water, which has relatively high conductivity (1,000-10,000 uS/cm) and high ionic mobility. However, the conductivity of the heavy ends is not sufficient for conventional electrodialysis devices, systems, and methods to be used. Specifically, there is not sufficient conductivity in the heavy ends fluid to use the heavy ends as both the ion source and sink, as is common in typical electrodialysis.

Additionally, ion exchange membranes require some minimum amount of water to remain hydrated, which is critical to their function. Accordingly, rather than using the heavy ends as the brine or ion sink, a second, dissimilar fluid is provided as the brine. Choice of this brine is crucial to the performance of the process.

An aqueous brine containing only NaCl and KCl would result in the precipitation of portions of the heavy ends, because the constituents comprising the heavy ends have low solubility in water. Accordingly, the addition of acetic acid to the brine solution can mitigate the precipitation.

Additionally, the high concentration of acetic acid in the diluate (heavy ends) provides a unique benefit to the electrodialysis process. Given the low pH of the Heavy Ends stream (typically at or below pH 1.0), acetic acid is essentially fully associated, or non-ionized. This allows the electrodialysis process to target the contaminant (e.g., ionized species) without having to compete with a species many times more concentrated, as would be the case if the pH were closer to the pKa value of acetic acid, 4.75. In some embodiments, the process described herein may take place at a pH of less than 4.75.

As used herein, the terms "brine" and "salt solution", are used interchangeably, and refer to a salt-containing aqueous solution. The salt in the water might include potassium chloride and might also pertain to other inorganic salts.

Additionally, as used herein, the term "heavy ends" refers to the organic solution. The components could include acetic acid, water, ethylene glycol, vinyl acetate, ethylene, and acetate compounds (monomers, oligomers, and polymers).

FIG. 1 shows an electrodialysis device 100 for the removal of ions from heavy ends, according to some embodiments. Electrodialysis device 100 can include CEMs 104 and AEMs 106 sandwiched between two electrodes 102. In some embodiments, one or more CEM 104 and one or more AEM 106 may alternate throughout a length of the electrodialysis device 100.

An electrode 102 is shown on opposing ends of electrodialysis device 100. One electrode 102 can be a cathode and another electrode 102 can be an anode. In some embodiments, one or more electrodes 102 can encompass one or more fluid channels for electrolyte stream 112. For example, a fluid channel for electrolyte stream 112 of electrode 102 can be located between one or more CEM 104 and an electrode 102, or between one or more AEM 106 and an electrode 102. Electrodialysis device 100 may also include one or more fluid channels for influent streams 136*a* and 136*b*. Brine stream 136 and heavy ends 138 may be located between a CEM 104 and an AEM 106. In some embodiments, ions of the heavy ends 138 are transferred to the brine stream 136 as the streams pass through electrodialysis device 100.

AEM 106 can allow passage of negatively charged ions and can substantially block the passage of positively charged ions. Conversely, CEM 104 can allow the passage of positively charged ions and can substantially block the passage of negatively charged ions. For example, the positive ions (e.g., K+, CA2+, etc.) of the heavy ends 138 are drawn across the CEM 104 defining the intermembrane chamber to which a particular positive ion originates, and toward the anode 102. Similarly, the negative ions (e.g., C2H3O2−, etc.) of the heavy ends 138 are drawn across the AEM 106 defining the intermembrane chamber to which a particular negative ion originates, and toward the cathode 102. Accordingly, the brine stream 136 exits electrodialysis device 100 comprising more ions than when it entered electrodialysis device 100, and heavy ends 138 exits electrodialysis device 100 comprising less ions than when it entered electrodialysis device 100.

Electrolyte stream 112 may be in direct contact with one or more electrodes 102. In some embodiments, electrolyte stream 112 can be any one or more of a variety of conductive fluids including, but not limited to, raw influent, a separately managed electrolyte fluid, NaCl solution, sodium sulfate solution, or iron chloride solution.

When an electric charge is applied to one or more electrodes 102 of electrodialysis device 100, the ions of brine stream 136 and heavy ends 138 flowing through an intermembrane chamber between any two ion-exchange membranes (i.e., one or more CEM 104 and one or more AEM 106) can migrate towards the electrode of opposite charge. Specifically, ion-exchange membranes can comprise ionically conductive pores having either a positive or a negative charge. These pores can be permselective, meaning that they selectively permeate ions of an opposite charge. Thus, the alternating arrangement of the ion-exchange membranes can generate alternating intermembrane chambers comprising decreasing ionic concentration and comprising increasing ionic concentration as the ions migrate towards the oppositely-charged electrode 102.

In some embodiments, an intermembrane chamber can be formed from a spacer border and a spacer mesh and can create a path for fluids to flow. The number of intermembrane chambers may be increased by introducing additional alternating pairs of ion-exchange membranes. Introducing additional alternating pairs of CEMs 104 and AEMs 106 (and the intermembrane chambers formed between each pair of ion-exchange membranes) can also increase the capacity of electrodialysis device 100. In addition, the functioning ability of an individual ion-exchange cell (i.e., a single CEM 104 paired with a single AEM 106 to form a single intermembrane chamber) can be greatly augmented by configuring ion-exchange cells into ion-exchange stacks (i.e., a series of multiple ion-exchange cells.)

As described above, ions of brine stream 136 and/or heavy ends 138 flowing through an intermembrane chamber can migrate towards electrode 102 of opposite charge when an electric current is applied to electrodialysis device 100. The ion-exchange membranes have a fixed charge (CEMs have a negative charge, AEMs have a positive charge). Thus, as a counter-ion approaches an ion-exchange membrane (e.g., as a cation approaches a CEM), the counter-ion is freely exchanged through the membrane. The removal of this counter-ion from the stream makes the stream a product stream. On the other hand, when a co-ion approaches the ion-exchange membrane (e.g., as an anion approaches a CEM), it is electrostatically repelled from the CEM. This separation mechanism can separate brine stream 136 and heavy ends 138 into two different streams of opposite ionic charge.

Figure 2:
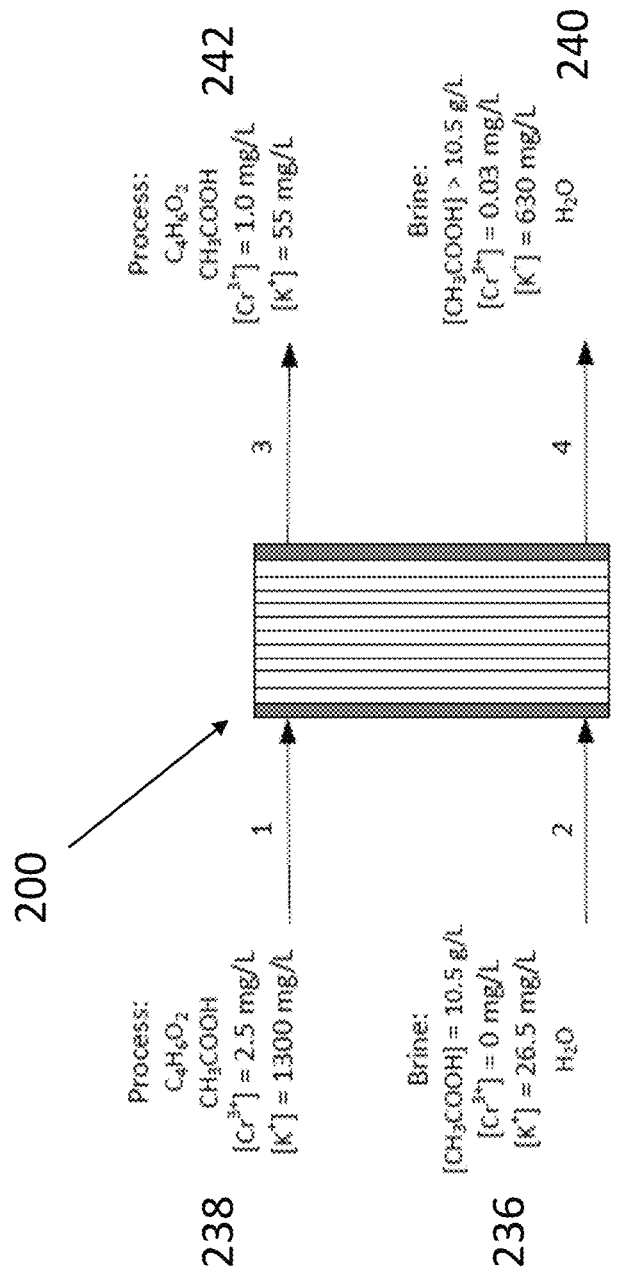
FIG. 2 shows a process diagram of an electrodialysis device for the removal of ions from heavy ends, according to some embodiments.

FIG. 2 shows a process diagram of an electrodialysis device 200 for the removal of ions from heavy ends, according to some embodiments. As shown, electrodialysis device comprises two inlet streams: brine stream 236 and heavy ends 238, and two outlet streams: brine stream 240 and product stream 242.

FIG. 2 further shows one example of possible compositions of the brine inlet stream 236, heavy ends 238, brine outlet stream 240, and product stream 242. In some embodiments, brine inlet stream 236 may comprise 1-50, 5-40, 5-30, 5-20, or 5-15 g/L acetic acid. In some embodiments, brine inlet stream 236 may comprise less than or equal to 50, 40, 30, 20, 15, 10, or 5 g/L acetic acid. In some embodiments, brine inlet stream 236 may comprise more than or equal to 1, 5, 10, 15, 20, 30, or 40 g/L acetic acid. In some embodiments, brine inlet stream 236 may comprise 1-60, 5-50, 10-40, or 20-30 mg/L potassium ions. In some embodiments, brine inlet stream 236 may comprise less than or equal to 60, 50, 40, 30, 20, 15, 10, or 5 mg/L potassium ions. In some embodiments, brine inlet stream 236 may comprise more than or equal to 1, 5, 10, 15, 20, 30, 40, or 50 mg/L potassium ions. In some embodiments, brine inlet stream 236 comprises no chromium ions. In some embodiments, brine inlet stream 236 comprises 1-20 mg/L chromium ions. In some embodiments, brine inlet stream 236 comprises less than or equal to 20, 15, 10, or 5 mg/L chromium ions. In some embodiments, brine inlet stream 236 comprises greater than or equal to 1, 5, 10, or 15 mg/L chromium ions. Brine inlet stream 236 can also comprise water. In some embodiments, the composition of heavy ends 238 and brine inlet 236 streams are different.

In some embodiments, heavy ends 238 comprises methyl acrylate and/or acetic acid. In some embodiments, heavy ends 238 comprises 1-30, 1-20, or 1-10 mg/L chromium ions. In some embodiments, heavy ends 238 comprises less than or equal to 30, 20, 10, or 5 mg/L chromium ions. In some embodiments, heavy ends 238 comprises greater than or equal to 1, 5, 10, or 20 mg/L chromium ions. In some embodiments, heavy ends 238 comprises 1-2500, 500-2000, or 1000-1500 mg/L potassium ions. In some embodiments, heavy ends 238 comprises less than or equal to 2500, 2000, 1500, 1000, or 500 mg/L potassium ions. In some embodiments, heavy ends 238 comprises greater than or equal to 1, 500, 1000, 1500, or 2000 mg/L potassium ions.

In some embodiments, brine outlet stream 240 comprises 1-50, 5-40, 5-30, 5-20, or 5-15 g/L acetic acid. By choosing acetic acid rather than an acetate salt, such as sodium acetate for example, the possibility of contamination of the Heavy Ends stream can be mitigated due to the additional cation (which could result in ash). In some embodiments, brine outlet stream 240 may comprise less than or equal to 50, 40, 30, 20, 15, 10, or 5 g/L acetic acid. In some embodiments, brine outlet stream 240 may comprise more than or equal to 1, 5, 10, 15, 20, 30, or 40 g/L acetic acid. In some embodiments, brine outlet stream 240 comprises 0.001-20, 0.01-10, 0.01-5, 0.01-1, or 0.01-0.1 mg/L chromium ions. In some embodiments, brine outlet stream 240 comprises less than or equal to 20, 10, 5, 1, 0.1, or 0.01 mg/L chromium ions. In some embodiments, brine outlet stream 240 comprises more than or equal to 0.001, 0.01, 0.1, 1, 5, or 10 mg/L chromium ions. In some embodiments, brine outlet stream 240 comprises 1-1500, 200-1200, or 400-1000 mg/L potassium ions. In some embodiments, brine outlet stream 240 comprises less than or equal to 1500, 1200, 1000, 800, 600, 400, or 200 mg/L potassium ions. In some embodiments, brine outlet stream 240 comprises greater than or equal to 1, 200, 400, 600, 800, 1000, or 1200 mg/L potassium ions. In some embodiments, brine outlet stream 240 may also comprise water.

In some embodiments, product stream 242 may comprise methyl acrylate and/or acetic acid. In some embodiments, product stream 242 may also comprise 0.1-20, 0.5-10, or 0.5-5 mg/L chromium ions. In some embodiments, product stream 242 comprises less than or equal to 20, 15, 10, 5, 3, 2, 1, or 0.5 mg/L chromium ions. In some embodiments, product stream 242 may also comprise greater than or equal to 0.1, 0.5, 1, 2, 3, 5, or 10 mg/L chromium ions. In some embodiments, product stream 242 may comprise 1-500, 10-100, or 20-60 mg/L potassium ions. In some embodiments, product stream 242 includes less than or equal to 500, 400, 300, 200, 100, 80, 60, 40, 20, or 10 mg/L potassium ions. In some embodiments, product stream 242 comprises greater than or equal to 1, 10, 20, 40, 60, 80, 100, 200, 300, or 400 mg/L potassium ions.

In some embodiments, the product stream 242 comprises 1-50% the total amount of ions as that of heavy ends stream 238. In some embodiments, product stream 242 comprises less than or equal to 50, 40, 30, 20, 15, 10, or 5 the total amount of ions as that of heavy ends stream 238. In some embodiments, product stream 242 comprises more than or equal to 1, 5, 10, 15, 20, 30, or 40% the total amount of ions as that of heavy ends stream 238.

In some embodiments, product stream 242 comprises 5-75% the amount of chromium ions as that of heavy ends stream 238. In some embodiments, product stream 242 comprises less than or equal to 75, 70, 60, 50, 40, 30, 20, or 10% the amount of chromium ions as that of heavy ends stream 238. In some embodiments, product stream 242 comprises more than or equal to 5, 10, 20, 30, 40, 50, 60, or 70% the amount of chromium ions as that of heavy ends stream 238. In some embodiments, brine inlet 236 comprises no chromium ions.

In some embodiments, product stream 242 comprises 0.1-20% the amount of potassium ions as that of heavy ends stream 238. In some embodiments, product stream 242 comprises less than or equal to 20, 18, 16, 15, 14, 12, 10, 8, 6, 4, 2, or 1% the amount of potassium ions as that of heavy ends stream 238. In some embodiments, product stream 242 comprises more than or equal to 0.1, 1, 2, 4, 6, 8, 10, 12, 14, 16, or 18% the amount of potassium ions as that of heavy ends stream 238.

In some embodiments, brine outlet stream 240 comprises 200-3000% the amount of potassium ions as that of brine inlet stream 236. In some embodiments, brine outlet stream 240 comprises less than or equal to 3000, 2500, 2000, 1500, 1000, 900, 800, 700, 600, 500, 400, or 300% the amount of potassium ions as that of brine inlet stream 236. In some embodiments, brine outlet stream 240 comprises more than or equal to 200, 300, 400, 500, 600, 700, 800, 900, 1000, 1500, 2000, or 2500% the amount of potassium ions as that of brine inlet stream 236.

In some embodiments, the brine inlet 236 comprises 0.1-25% the amount of potassium ions as that of heavy ends stream 238. In some embodiments, brine inlet 236 comprises less than or equal to 25, 20, 15, 10, 5, 2, or 1% the amount of potassium ions as that of heavy ends stream 238. In some embodiments, brine inlet 236 comprises more than or equal to 0.1, 1, 2, 5, 10, 15, or 20% the amount of potassium ions as that of heavy ends stream 238.

In some embodiments, an electrodialysis process (e.g., that depicted in FIG. 2) may remove 40-100% or 50-70% of the chromium ions from the heavy ends 238. In some embodiments, an electrodialysis process (e.g., that depicted in FIG. 2) may remove less than or equal to 100, 90, 80, 70, 60, or 50% of the chromium ions from the heavy ends 238. In some embodiments, an electrodialysis process (e.g., that depicted in FIG. 2) may remove more than or equal to 40, 50, 60, 70, 80, or 90% of the chromium ions from the heavy ends 238.

In some embodiments, an electrodialysis process (e.g., that depicted in FIG. 2) may remove 70-100% or 95-100% of the potassium ions from the heavy ends 238. In some embodiments, an electrodialysis process (e.g., that depicted in FIG. 2) may remove less than or equal to 100, 95, 90, 85, 80, or 75% of the potassium ions from the heavy ends 238. In some embodiments, an electrodialysis process (e.g., that depicted in FIG. 2) may remove more than or equal to 70, 75, 80, 85, 90, or 95% of the potassium ions from the heavy ends 238.

In some embodiments, the conductivity of heavy ends 238 is 1-100 microsiemens per centimeter. In some embodiments, the conductivity of heavy ends 238 is less than or equal to 100, 80, 60, 40, 20 10, or 5 microsiemens per centimeter. In some embodiments, the conductivity of heavy ends 238 is more than or equal to 1, 5, 10, 20, 40, 60, or 80 microsiemens per centimeter. The lower the conductivity of heavy ends 238, the less likely a conventional electrodialysis process is suitable for removing the ions of heavy ends 238.

EXAMPLE

An electrodialysis cell was built and the following solutions were used to run the electrodialysis test: heavy ends (process stream), 1% (w/v) acetic acid in water (brine stream) and tap water (electrolyte stream).

The solutions were flowed and recirculated in the cell for at least 5 minutes to equilibrate the membranes prior to starting the experiment and to check for internal leaks. After 5 minutes, the starting conductivities of the streams were recorded, and initial samples were collected for in-house testing. The test was run in constant-current mode (0.75 A). The conductivities and voltages were recorded every 5 minutes, and samples for testing were collected. The experiment was stopped when the current dropped below 0.75 A, suggesting that the process stream has been depleted of ions.

The ion concentrations in the heavy ends were verified by a third-party laboratory using inductively coupled plasma (ICP), while the ion concentration in the brine was measured using in-house ion chromatography (IC). The results from ICP analysis of the Heavy Ends after running the test for 40 minutes are summarized in Table 1.

TABLE 1

| Heavy Ends Quality Results. | | | |
| --- | --- | --- | --- |
| Parameters | Units | Initial Process | Final Process |
| Cr³⁺ | mg/L | 2.49 | 1.04 |
| K⁺ | mg/L | 1280 | 55.3 |

The results indicate that using a 1% acetic acid in the brine stream: (1) provided sufficient conductivity to perform electrodialysis, (2) prevented precipitation of the heavy ends, and (3) prevented contamination of the heavy ends stream. The results show that the current method used is effective at removing ions from the heavy ends, with 96% K+ and 58% Cr3+ removal. The lower percentage removal for Cr3+ suggest that transport through the ion-exchange membranes is slower than K+, which is expected for trivalent versus monovalent ions.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Any of the systems, methods, techniques, and/or features disclosed herein may be combined, in whole or in part, with any other systems, methods, techniques, and/or features disclosed herein.

The invention claimed is:

1. An electrodialysis system for removing ions from heavy ends, comprising:

an electrodialysis device comprising a brine inlet stream, a heavy ends inlet stream, a brine outlet stream, and a product outlet stream, wherein the heavy ends inlet stream comprises a non-aqueous organic waste stream generated from an acetoxylation process for forming vinyl acetate monomer, wherein the non-aqueous organic waste stream comprises acetic acid, ethylene glycol, vinyl acetate, ethylene, and acetate compounds, wherein the brine outlet stream comprises more acetic acid than the brine inlet stream, and the product outlet stream comprises no more than 15% the amount of ions relative to an amount of ions in the heavy ends inlet stream, and wherein the conductivity of the heavy ends inlet stream is less than or equal to 10 microsiemens per centimeter.

2. The electrodialysis system of claim 1, wherein each of the heavy ends inlet stream, the brine inlet stream, the brine outlet stream, and the product outlet stream comprise one or more of chromium or potassium ions.

3. The electrodialysis system of claim 1, wherein the product outlet stream comprises no more than 50% the amount of chromium ions as that of the heavy ends inlet stream.

4. The electrodialysis system of claim 1, wherein the product outlet stream comprises no more than 15% the amount of potassium ions as that of the heavy ends inlet stream.

5. The electrodialysis system of claim 1, wherein the brine outlet stream comprises at least 400% the amount of potassium ions as that of the brine inlet stream.

6. The electrodialysis system of claim 1, wherein the brine inlet stream comprises no chromium ions.

7. The electrodialysis system of claim 1, wherein the heavy ends inlet stream comprises a composition that is different from the brine inlet stream.

8. The electrodialysis system of claim 1, comprising two or three electrodialysis devices.

9. The electrodialysis system of claim 1, wherein the system achieves 50-70% removal of chromium ions from the heavy ends inlet stream.

10. The electrodialysis system of claim 1, wherein the system achieves 85-100% removal of potassium ions from the heavy ends inlet stream.

* * * * *